United States Patent [19]

Cooper et al.

[11] Patent Number: 4,677,470

[45] Date of Patent: Jun. 30, 1987

[54] IMAGE REVERSAL CORRECTION SYSTEM FOR VIDEO ENDOSCOPES

[75] Inventors: David H. Cooper, Saratoga; Janos L. Hunyady, San Jose, both of Calif.

[73] Assignee: Fuji Photo Optical Company, Ltd., Omiya, Japan

[21] Appl. No.: 854,482

[22] Filed: Apr. 22, 1986

[51] Int. Cl.[4] .......................... A61B 1/04; A61B 1/06; H04N 7/18

[52] U.S. Cl. .......................... 358/98; 128/4; 128/6; 358/140; 358/160

[58] Field of Search ............... 358/98, 93, 140, 160, 358/280; 128/4, 6

[56] References Cited

U.S. PATENT DOCUMENTS 4,247,872 1/1981 Wada .................... 358/280

FOREIGN PATENT DOCUMENTS 0121779 9/1980 Japan ...................... 358/98
0136092 10/1981 Japan ..................... 358/98

Primary Examiner—Howard W. Britton
Attorney, Agent, or Firm—Michael L. Harrison

[57] ABSTRACT

An endoscope subsystem, for a video endoscope system of the type having an insertion tube employing a video sensor, an optical imaging system for forming images on the sensor, and a video display for displaying an image derived from the sensor, which subsystem is for electronically correcting the side-to-side image reversal of the image represented by signals derived from the sensor in response to light intensities in a scene viewed by the endoscope, which reversal may result from the use of a folded optic imaging system in order to achieve compactness in the distal end of the endoscope.

2 Claims, 4 Drawing Figures

IMAGE REVERSAL CORRECTION SYSTEM FOR VIDEO ENDOSCOPES

BACKGROUND OF THE INVENTION

The present invention relates to processing circuitry for video endoscope systems and in particular to video processing circuitry for electronically correcting the image orientation of a folded optical imaging system wherein the optical image is reversed.

Video endoscope systems are now well-known in the art of endoscopy. Various endoscope systems are described in U.S. Pat. No. 4,253,447 to Moore and U.S. Pat. No. 4,074,306 to Kakinuma. Such systems include light units which generate alternating fields of colored light for production of color images at the display, although the principles of endoscopy are equally, though less usefully, applied in black and white imaging as well.

The insertion tube of the endoscope provides access and visibility into body cavities. Typically the insertion tube contains a fiber optic light guide for directing light into the cavity to be viewed, an optical focusing section for gathering and focusing the reflected light, an image sensor for providing electrical output in response to the light input, electrical circuitry and connection means for triggering the image sensor and for transmitting signals back to a control unit.

Light transmitted through the fiber optic light guide is reflected from the cavity into which the viewing head is inserted. The optical imaging system gathers and focuses the reflected light to form an image on a solid state image sensor in the viewing head. The image sensor transmits an electrical signal back to the control unit in response to the intensity of light reflected within the cavity. The signal is processed according to its control unit and then later merged into a composite video signal compatible with a monitor.

In addition to the components which are associated purely with image production, it is also desirable, and practically speaking necessary, to include a biopsy channel, and water and air delivery channels.

Because these features must all be contained within the insertion tube of the endoscope, and because the overall diameter of the insertion tube is limited by the human anatomy, it is of paramount importance to optimize space utilization in the insertion tube.

In conventional video endoscope systems, the imaging system at the distal end of the insertion tube conventionally places a solid state rectangular image sensor in a perpendicular orientation with respect to the optical axis of the imaging system and to the central axis of the insertion tube. Because the image sensor in such endoscopes is oriented perpendicular to the optical axis, the size of the image sensor is limited. In addition, since the image sensor provides a rectangular surface area greater than the circular surface area of the optical focusing section, it is difficult to package the biopsy channel, light guide and other features required to be contained within the insertion tube.

Because it is desirable to minimize the size of the distal end of the endoscope while at the same time obtaining maximum used the area of view of the optical system and sensor, a compact optical imaging system has been devised, as described in copending patent application Ser. No. 06/611,618, for a Compact Optical Imaging System, with specific application to video endoscopy, which maximizes the space utilization in the insertion tube.

Unlike conventional viewing heads in use in color video endoscopes, the image sensor in the compact imaging system is oriented with its plane other than perpendicular to the axis of the optical focusing section, preferable parallel to the optical axis. To allow this orientation, which is more desirable from the performance stand point, the invention includes means for turning the light away from the optical axis so that the light rays impinge on the image sensor even though the image sensor is oriented away from the objective lens optical axis. In the preferred embodiment, the image from the focusing section is turned 90 degrees to the image sensor by a glass wedge having a surface for internal reflection.

By placement of the image sensor in a plane parallel to the optical axis, an image sensor having a diagonal measurement which is substantially larger than the diameter of the optical focusing section can be utilized. By this devise, the compact optical imaging system thus provides a viewing head in the insertion tube of an endoscope which optimizes space utilization and permits the use of a substantially larger image sensor and the support of associated electrical circuitry.

The viewing head thus configured however suffers from the drawback, heretofore not adequately overcome, that the image produced at the sensor is reversed with respect to the image orientation which would be correct according to the specifications of the sensor manufacturer, due to the presence of the mirror in the optical path between the object lens and the sensor.

Accordingly, a need exists for an apparatus to correct the image reversal for display on a conventional video monitor such that the image thereby displayed is properly oriented.

SUMMARY OF THE INVENTION

The present invention provides a solution to the image reversal problem described above by providing a subsystem, adapted for use in a video endoscope systems of the type used for displaying an image from inside a cavity onto a monitor, which subsystem includes means for electronically correcting the side-to-side image reversal which is a consequence of folding the optical system in a confined space in order to obtain minimum cross-sectional area for the distal end of the endoscope.

The subsystem in accordance with the present invention produces a corrected image on the monitor by altering the electronic signal transmitted from the image sensor during the processing of the signal by the control unit.

The subsystem transforms the image presented by processing the data representing each video line so that the original relative time of exit from the sensor is reversed in reference to its original time of arrival, thereby causing data representing elements at the right of the original scene to appear at the left of the scene which is ultimately displayed, and vice versa. The subsystem accomplishes this transformation in realtime, within a delay time no greater than the time of the sweep of a single horizontal line, by providing two identical random access memories, addressed by identical addresses from an address generator but alternating the function of reading and writing data from one line to the other, so that as one memory is writing data to an output bus, the other is reading data from the input bus.

An address sequence generator provides a forward and reverse pattern of addresses which are supplied identically to the two memories. Since the roles of the two memories are exchanged every line, the effect of the forward and reverse patterns of the address sequence is to cause the data stored in each memory to be last-in, first-out. The outputs of the memories are then combined to give a video data output bus having image information which is reversed with respect to that of the input bus.

For a fuller understanding of the nature and advantages of the invention, reference should be made to be following detailed description taken in conjunction with accompanying drawings.

DESCRIPTION OF THE PREFERRED EMBODIMENT

Figure 1:
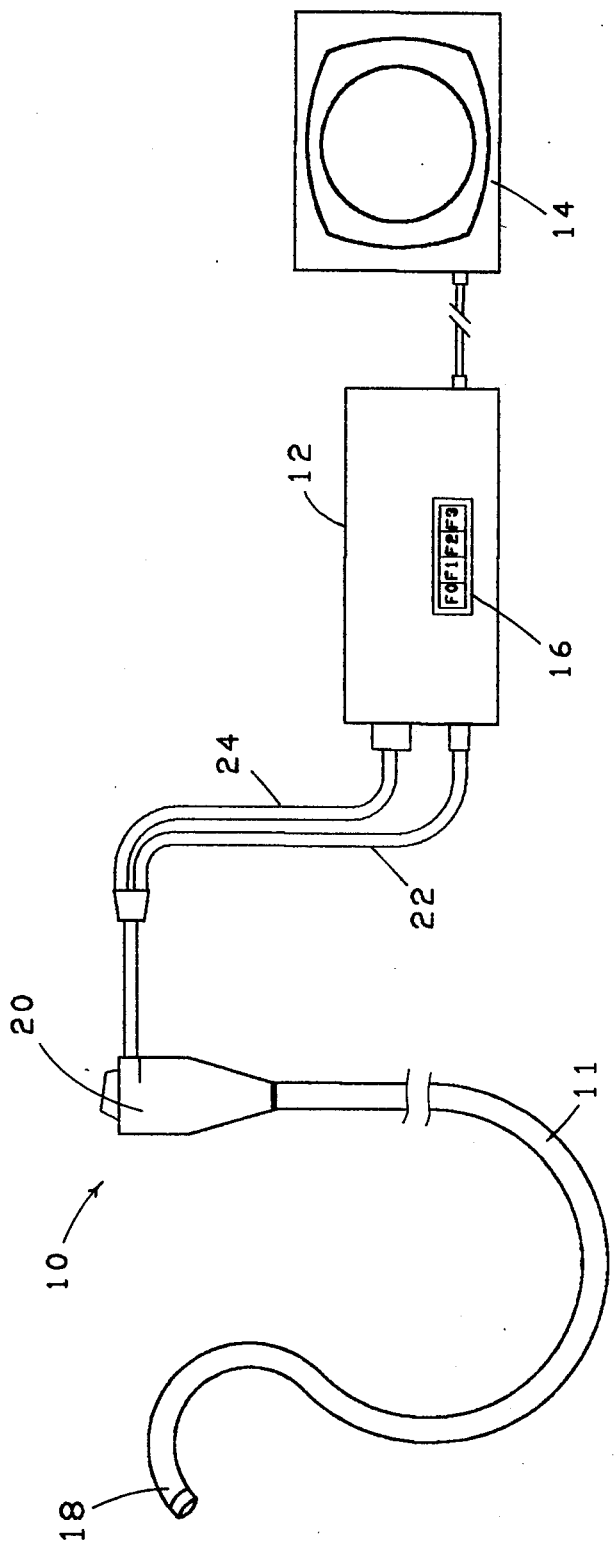
FIG. 1 is a simplified diagram illustrating a video endoscope including its display monitor and control unit, of a type with which the present invention may be employed.

Referring first to the simplified diagram of FIG. 1, a video endoscope subsystem of the type under consideration includes an endoscope section 10 and a control unit 12. The control unit 12 provides a video output signal to a monitor 14 for display of the image. The endoscope section 10 includes an insertion tube 16 having a viewing head 18 at its distal end, an operation section 20 for control of the endoscope by the user, an electrical connector 22 between the operating section 20 and the control unit 12, and a mechanical connector 24 between the operating section 20 and control unit 12. Light supplied by a light source in the control unit 12 passes through a fiber optic light guide through connector 24, operating section 20, insertion tube 16 and viewing head 18. Included in the viewing head 18 of the endoscope 10 is the image sensor and the lens assembly for directing and focusing the reflected light from the cavity back to the image sensor. An electrical connection is made between the image sensor and the control unit 12 through an electrical connector in insertion tube 16 between viewing head 18 and operating section 20 and through electrical connector 22. The signal from the image sensor, is transmitted to the video processor where electronic correction of the image reversal occurs.

Figure 2:
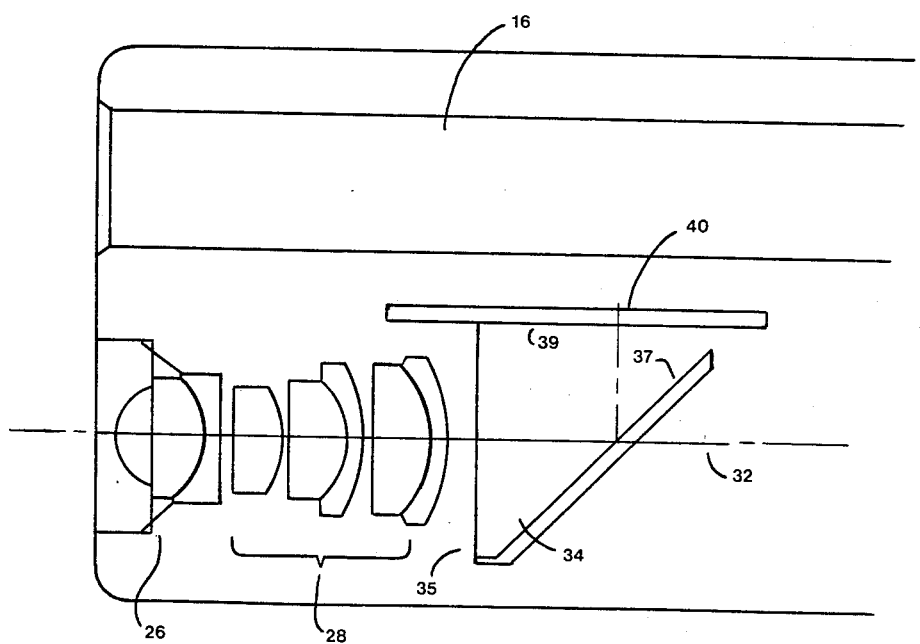
FIG. 2 is a sectional view of the distal end of a video endoscope of a type to which the present applies illustrating, in section, the substrate, the image sensor and a glass wedge bonded to the image sensor.

The above general explanation of the video endoscope subsystem can be further understood with particular reference to the image reversal correction subsystem of the present invention by reference to the diagram of the compact optical imaging subsystem, shown in FIG. 2. Within the distal end of the endoscope insertion tube, which is the end inserted into the cavity to be observed, are light output guides, a biopsy channel, an air/water channel, and the optical focusing section for gathering and focusing the reflected light from the cavity.

In FIG. 2, which is a vertical section of the distal end of an endoscope insertion tube, there is illustrated the biopsy channel 16 and the lens assembly for gathering the reflected light from the cavity and focusing it to the image sensor 40. The lens assembly comprises an objective lens assembly 26, which provides a wide angle field of view, and a focusing lens assembly 28 which takes the light from the objective lens assembly and focuses it into an image which is ultimately turned 90 degrees to form an image on image sensor 40. The objective lens assembly 26 and focusing lens assembly 28 have a common optical axis 32. The light rays 30 from the lens assembly, 26 and 28, are reflected away from the original optical axis 32 by a glass wedge 34 which has a light input face 35, a surface 37 which causes internal reflection of light rays 30, and a light output face 39.

The image sensor 40 is shown in edge view in FIG. 2 with its planar surface generally parallel to optical axis 32. The image sensor 40 depicted may be, for example, a frame-transfer charge-coupled device (CCD) which converts light falling on the sensor into signals representing the image formed by focusing lens assembly 28. Light from the lenses is then turned 90 degrees from its original axis by glass wedge 34, and is caused to strike the pixel elements present in the CCD 40.

Because the image sensor 40 is oriented other than perpendicular to the optical axis 32, a substantially larger image sensor can be used, in this case a frame-transfer image sensor which requires a substantially larger surface area than other types of image sensors.

In the compact optical system being described, the integrated construction of the image sensor, substrate and glass wedge allows the image sensor and associated circuitry to be provided in the relatively limited space between the lens assembly and biopsy channel 16 of the endoscope viewing head. As is apparent from simple geometry, if the frame-transfer CCD were to be oriented perpendicularly to the optical axis 32, as in conventional endoscopes, a CCD of the desired size would not fit within the available space.

Although the prism allows the placement of the image sensor on its side, it is not possible to use the image thus produced directly. This result obtains from the fact that the designers of the image sensor arrays arrange for its output to correspond to the scanning relationships of a standard NTSC television system. Thus, it is designed such that when an image is formed on the sensor by a conventional lens system, the output video, when applied to standard video monitor, will result in an image which is correctly oriented with respect to the original scene, i.e.; not reversed left-to-right or top-to-bottom. However, the image which actually falls on the image sensor is reversed both left-to-right and top-to-bottom. The final result is correct because the designer caused the video output to be taken in a sequence which results in the finally displayed image being correctly oriented.

Consider now what happens when a mirror or a prism is installed within the optical path. The effect of the prism will be to reverse the image-to-object orientation from that of its normal condition. For explanation, let us assume that the reversing mirror is located so that the axis of its tilt is parallel to horizon of the object field. The effect of the reversal upon the image at the image plane is to reverse the already once-reversed image top-to-bottom, leaving it erect. The effect of the mirror on the vertical axis of the object is none however, so the image remains reversed left-to-right.

Now if the endoscope, modified as described by the insertion of the mirror in its optical path, is employed with the conventional video processing system and its associated monitor, the result will be an image displayed on the monitor which is reversed, top to bottom, because the expectation of the sensor designer was that the image would be reversed in all respects when applied to the sensor. But with the mirror inserted, it is not.

It is of course possible to modify the monitor scanning circuitry so that the image is displayed correctly. It is also possible to re-orient the mounting plane of the sensor so that the image is displayed top-to-bottom in its correct relationship on an unmodified system. Unfortunately, this re-orientation corrects the vertical display at the expense of reversing the horizontal display.

A reversing lens system could be employed to correct the top to bottom image orientation before it reaches the sensor, but if the system has the "fold" which is necessary for compactness, and achieved by the mirror, one of the axes would remain reversed in any case. Moreover, the additional length of the optical system would require additional space and the desirable size reduction achieved by the folded system would be lost.

Reversing the direction of scan by modifying the horizontal scan circuitry of the monitor is a complete solution to the problem, but from the standpoint of ultimate convenience and versatility, it is an undesirable solution because the monitor is among the most standard of the video system components and preferably should be readily interchangeable among systems. Modifying a monitor which corrects the image reversal produced by this particular type of endoscope would make the monitor incompatible with one having a conventionally-oriented sensor. Also, not only monitoring but, in addition, recording must be considered; the image recorded for later playback on a standard video display system would be reversed.

A better solution is that of providing a selectable reverse/non-reverse video subsystem which has the ability to deal with the video outputs of both conventional and folded optic systems on an electronically selectable basis.

Figure 3:
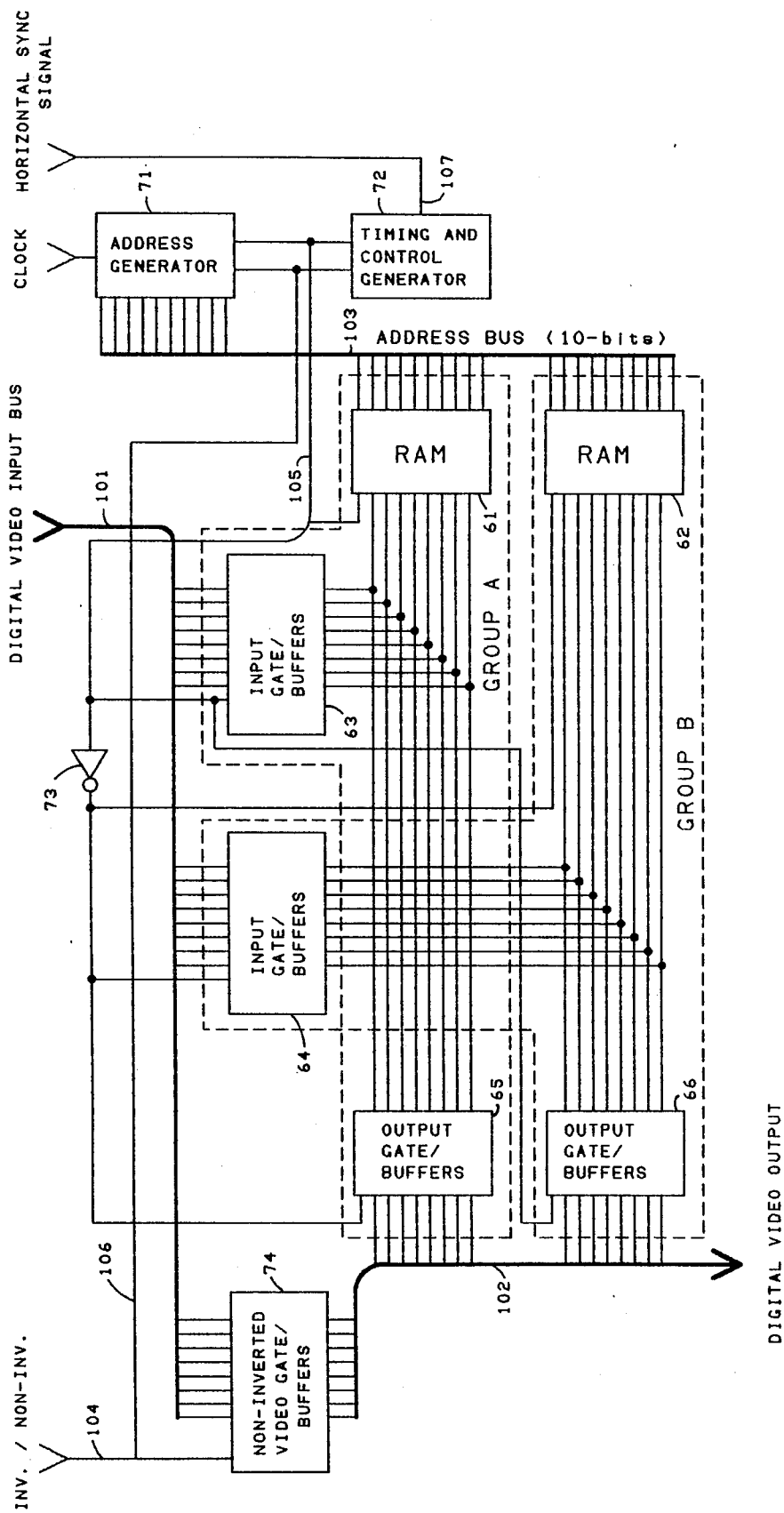
FIG. 3 is a simplified block diagram showing the components of an image reversal subsystem for video endoscopes in accordance with the present invention.

Referring now to FIG. 3., there is shown a block diagram of an image reversal correction subsystem suitable for use in an endoscope having either a folded optical system or a conventional one. In the figure, there are shown random access memories 61 and 62, input gates and buffers 63 and 64, output buffers 65 and 66, up down counter 71, bus enable and counter flip-flop 72, inverter 73 and video buffer and gate 74. It will assist understanding of the subsystem to consider that random access memory 61, input buffer 63, and output buffer 65 (odd numbers), serve as units grouped around the memory for one line of video, while random access memory 62, input buffer 64, and output buffer 66 (even numbers), serve as units grouped around the memory for another line of video. In operation, the groups are employed simultaneously, but for alternating functions. In other words while, for example, Group A, the odd numbered group, is being employed to write digital video into its random access memory 61, Group B, the even numbered group, is being employed to read digital video out of its random access memory 62.

It would be possible to employ a single random access memory, operating at a high speed, to load one line of video into memory, then to unload video out of memory so that if the timing is made to be first-in, last-out, the effect on the output video is to reverse its orientation with respect to the input. The use of a memory in such a way requires greater speed than can be readily achieved by existing circuitry for employment at a speed such that the entire process can occur during the time interval in between single adjacent lines of video, i.e., during the horizontal flyback time. Since this time is very short, it would be difficult if not impossible to accomplish this, at least in a cost efficient manner.

Systems also presently exist, intended for television broadcast and the like, which are capable of storing entire frames of video data, gathered during the time interval of one frame, and thus available for use no less than at least one frame time delay later, which systems could be used to cause a reversal of the image stored therein by virtue of reversing the access sequence for one or both dimensions of the field. These systems are unsuitable for the present purpose due to size and cost, in that they employ at least several hundred times more memory, for comparable video performance at the display, and employ expensive microprocessors which must be programmed to achieve the desired reversal.

Thus, it is necessary to find a subsystem which accomplishes the desired reversal, using signal pace such that the desired function can be implemented using circuit elements which are cost efficient.

The present invention efficiently solves the problem, which is posed by necessity for operating at a high speed, by line-by-line reversal of each video within the delay of one video line, i.e. within approximately 1/15,000 of a second instead of perhaps one-tenth of that time, while at the same time providing for unusually efficient cooperation between the elements of the processor. In consequence, the circuitry employed can operate at a more relaxed and reliable speed, while providing the same ultimate results as a subsystem which operates within the flyback time of a single line.

In the figure, video data is obtained by digitizing the analog output of the video sensor located within the distal end of the endoscope, by well known processes. The level of intensity resolution is a matter of design trade-offs, but 8 bits is a common choice which provides suitable resolution and reasonable circuit complexity.

Once per field, each element of the sensor array, commonly referred to as a pixel, is resolved into a digital number of eight bits, the magnitude of which is related to the intensity of light falling on the pixel. In sequence of the scan, these words are applied to the digital video bus for video processing prior to display. Such processing may include color adjustment or filtering, contrast enhancement or compression, and the like.

Processing through the image reversal subsystem of the present invention is begun by applying the digital video to the digital video input bus 101. In sequence, each digital word in the data stream is loaded into a location within one of the random access memories 61 or 62. Let us assume, for example, that at the moment, Group A is active in the load, or "write", state.

Both of the random access memories 61 and 62, are preferably identical and both have a length sufficient to store a quantity of words equal in number to the number of pixels which comprise a line of video. The memories may be entirely randomly accessible, or may be structured such that their output is of a pre-selected sequence suitable for the display. The individual memory locations must be of a size suitable for storage of the digital words which are on the bus. Each memory can be enabled to either read or write data, in response to a control signal applied to the memory.

Address generator 71 provides a repeatable pattern of addresses which can be caused to occur in a forward or a reverse direction, Since there is no advantage to generating a series of addresses which are truly random, the address generator is preferably implemented by means of a binary up/down counter, which is initialized to zero at the beginning of operation and then counts up to and down from the highest address number for which there is data stored. In general, this number will correspond to the number of pixels per line of video. Selection of up or down mode is controlled by timing generator 72 in synchronism with the horizontal drive applied to the video display raster.

Gate/buffers 63 and 64 are cooperating arrays of gate/buffers having control inputs which can simultaneously engage and disengage the inputs to either of the gate/buffers.

To accomplish writing of the data into random access memory 61, gate/buffer 63 is enabled by a signal applied to line 105 by timing generator 72. Data is thus passed from the video input bus into the internal bus of group A, which is routed to both the random access memory 61 and the output gate/buffer 65. Random access memory 61 is commanded to write by a signal on line 105. On or before the arrival of the first word which it is desired to store, the address generator is initialized and begins to generate a sequence of addresses.

Each incoming word is thereafter stored at a location dictated by the address applied to the random access memory 61 at the moment the word is present at its inputs. The process continues similarly until the memory is filled.

When it is desired to read the random access memory 61 contents back out, the address generator 71 is enabled to begin generating the reverse sequence of addresses, in synchronism with the beginning of the next horizontal sweep. Concurrently, the read/write line state is changed by the timing generator so that gate/buffer 63 is disabled and gate/buffer 64 is enabled. For the preferred embodiment employing a simple up/down counter, the address sequence is simply the reverse sequential count, beginning at the highest number and counting toward zero.

Concurrently with the above process, the same addresses are applied to the address inputs of random access memory 62. Note however that the read/write control line 105 is applied to inverter 73, so that the logical significance of the control signal is inverted before it is applied to random access memory 62. Therefore, random access memory 62 is write-enabled at the time that random access memory 61 is read-enabled. Similarly, the output gate/buffer 66 is enabled while output gate/buffer 65 is disabled. Thus, the data stored in random access memory 62 is applied to the output bus 102 during the time that the write inputs of random access memory 61 are enabled and the output gate/buffer 65 is disabled.

The components of group A therefore operate to isolate their internal data bus from the output data bus when random access memory 61 is write-enabled, and to apply the data on the input data bus to the enabled inputs of random access memory 61. When the state of control line 105 is changed, the opposite occurs, with the output of random access memory 61 passed to the output data bus and the input data bus isolated.

A reciprocal action takes place with respect to the Group B components. The net effect of the above described operation is to store every other line of video in one of the random access memories during the period of time that the other random access memory is reading out the adjacent lines. But since the random access memories are addressed by the same address sequence, which is itself repetitively changed from forward to reverse direction on every other line, the effect is to cause the data stored in the random access memories to be read out in a sequence opposite to that in which it was originally stored, regardless of whether the addresses are occurring in forward or reverse direction.

Figure 4:
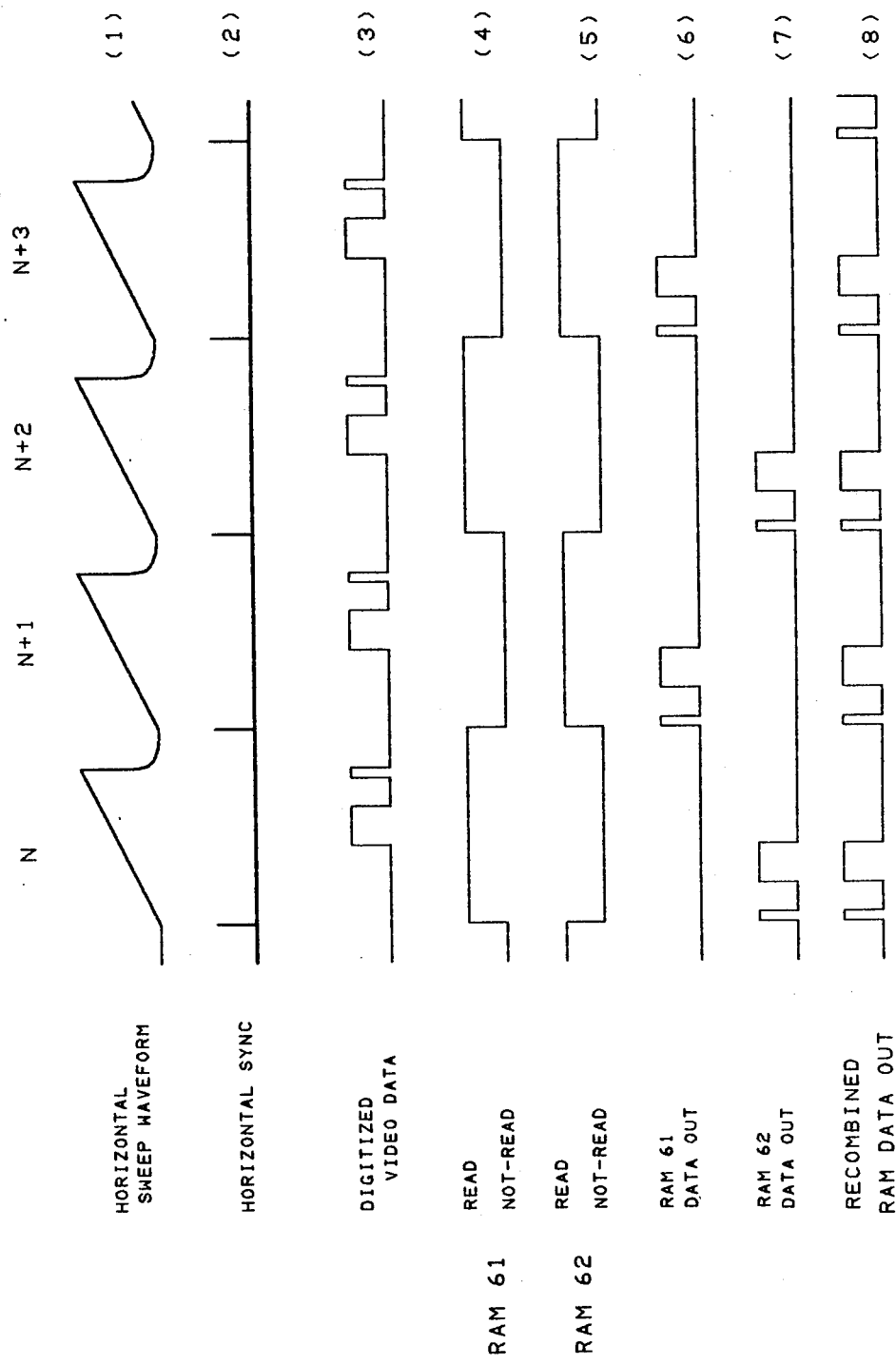
FIG. 4 is a signal timing diagram showing the interrelationship of data input, data flow within the subsystem, and data output, as well as the timing of control signals which are employed to accomplish the desired output.

Timing generator 72 provides the necessary control and synchronization signals required in accordance with the above description, synchronized to the horizontal sweep of the video display. The necessary timing relationships are shown in FIG. 4., wherein the effect of the above described action may also be seen. Referring to the FIG. 4., the first line (1) depicts the horizontal sweep waveform of the video display. The horizontal sync shown in line (2). Line (3) describes in simplified form the presence of video data as it is applied to the image reversal subsystem. Lines (4) and (5) indicate the timing of the enabling signals applied to the two random access memories. Lines (6) and (7) depict the outputs of the two random access memories and (8) shows the effect of recombination of the two random access memory outputs on the bus. It may be noted that the waveforms which depict the data outputs are reversed in time from those which represent the input, indicating that the first data into the memories is the last data out of the memories.

While the above described subsystem may be employed at all times in an endoscope system of the type which has a folded optical system, since its functions are all electronic, it is a simple matter to disconnect the subsystem and to bypass its function when it is desired to use an endoscope which does not either employ a folded optical system or otherwise cause an image reversal in the display. This function is accomplished by adding additional gate/buffers to the output bus. Gate/buffers 74 are paralleled with the outputs of gate/buffers 65 and 66. When enabled by a command on line 104, gate/buffers 74 pass data directly to the output bus, without processing through the image reversal correction subsystem. The same input is used to disable the address generator 71 and the timing and control generator 72.

While the preferred embodiments of the present invention have been illustrated in detail, it should be apparent that modifications and adaptations of those embodiments will occur to those skilled in the art. However, it is to be expressly understood that such modifications and adaptations are within the sphere and scope of the present invention as set forth in the following claims.

What is claimed is:

1. In a video endoscope system of the type having an insertion tube employing a video sensor, an optical imaging system for forming images on the sensor, and a video display for displaying images derived from the sensor, a subsystem for producing a side-to-side reversal of the image represented by signals derived from the sensor in response to light intensities in a scene viewed by the endoscope, comprising:

first and second addressable memory means, selectably communicating with input data signals, and selectably producing data outputs;

address generator means, communicating with the first and second memory means, for alternately generating a first sequence of addresses and a second sequence of addresses, the second of which sequences is the reverse of the first sequence, each of which sequences is generated during the time of one video display line, in synchronism with the horizontal sweep of the video display;

timing and control means for alternatively causing the first memory to be enabled to write the input data signals while the second memory is enabled to read, and then causing the first memory to be enabled to read while the second memory is enabled to write the input data signals, said alternation being in synchronism with the horizontal sweep of the video monitor.

means for combining the output data from the first and second memory means.

2. In a video endoscope system of the type having an insertion tube employing a video sensor, an optical imaging system for forming images on the sensor, and a video display for displaying an image derived from the sensor, a subsystem for producing a side-to-side reversal of the image represented by signals derived from the sensor in response to light intensities in a scene viewed by the endoscope, comprising:

a first memory for storing, in response to a write command, video data derived from the sensor and applied to the memory data inputs, at memory locations selected in accordance with addresses applied to memory address inputs, and for retrieving said data from memory data outputs, in response to a read command, from memory locations selected in accordance with addresses applied to the memory;

a second memory for storing, in response to a write command, video data derived from the sensor and applied to the memory data inputs, at memory locations selected in accordance with addresses applied to memory address inputs, and for retrieving said data from memory data outputs, in response to a read command, from memory locations selected in accordance with addresses applied to the memory;

an address generator, communicating with the first and second memory means, for alternately generating a first sequence of memory addresses and a second sequence of memory addresses which is the opposite sequence to the first sequence of memory addresses;

first input data gate means, responsive to signals derived from the sensor, having outputs which are applied to the first memory data inputs, and having an input for enabling or disabling the gate means;

second input data gate means responsive to signals derived from the sensor, having outputs which are applied to the second memory data inputs, and having an input for enabling or disabling the gate means;

first output data gate means responsive to outputs from the first memory data outputs, having outputs which are applied to an output bus, and having an input for enabling or disabling the gate means;

second output data gate means responsive to outputs from the second memory data outputs, having outputs which are applied to the an output data, and having an input for enabling or disabling the gate means;

a timing and control generator, for generating read and write commands which are applied to the first memory and the second memory, and for generating gate enable/disable commands which are applied to the enable inputs of the input and output gate means, all of which commands are synchronized to the scan of the display system, such that (a) for every other horizontal video sweep, the first input gate means and the second output gate means are enabled and the first memory is commanded to write, and the second input gate means and the first output gate means are disabled and the second memory is commanded to read, for the interval which includes (corresponds to) one line a video data, (b) for those horizontal video sweeps not mentioned in (a), the second input gate means and the first output gate means are enabled, the second memory is commanded to write, and the first input gate means and the second output gate means are disabled and the first memory is commanded to read, for the interval which includes one line a video data.

* * * * *